United States Patent [19]
Böning et al.

[11] 3,786,293
[45] Jan. 15, 1974

[54] ELECTRIC SALIENT-POLE SYNCHRONOUS MACHINE ROTOR SOLID METAL POLE PIECE

[75] Inventors: Walter Böning; Werner Leistner, both of Berlin, Germany

[73] Assignee: Siemens Aktiengesellschaft, Munich, Germany

[22] Filed: July 14, 1972

[21] Appl. No.: 272,054

[30] Foreign Application Priority Data
Feb. 25, 1972 Germany ............... P 22 09 735.4

[52] U.S. Cl. .................................. 310/269
[51] Int. Cl. ................................... H02k 1/24
[58] Field of Search ............... 310/262, 269, 162, 310/187, 190, 218

[56] References Cited
UNITED STATES PATENTS
1,422,145  7/1922  Stark .................................. 310/269
2,539,747  1/1951  Moore ............................. 310/269 X
3,280,355  10/1966  Ruelle et al ...................... 310/269

Primary Examiner—J. D. Miller
Assistant Examiner—Mark O. Budd
Attorney—Hugh A. Chapin

[57] ABSTRACT

An electric salient-pole synchronous machine rotor solid pole piece having a shoe through which slots are formed which extend from the axial edges of the shoe circumferentially inwardly, has means for electrically bridging the slots adjacent to the axial edges of the shoe.

5 Claims, 4 Drawing Figures

ELECTRIC SALIENT-POLE SYNCHRONOUS MACHINE ROTOR SOLID METAL POLE PIECE

BACKGROUND OF THE INVENTION

This invention relates to electric salient-pole synchronous machines having rotors having solid pole pieces.

Each of these pole pieces extends radially from the rotor's axis and at its outer end has a shoe which overhangs circumferentially with respect to the rotor rotation. The entire construction is an integral solid iron member.

When a synchronous salient-pole machine, such as a motor for example, having such pole pieces, is started and brought up to speed asynchronously, eddy currents are induced in each pole piece shoe by the rotating stator flux field that sweeps over each shoe. These eddy currents and the rotating stator flux determine the rotor torque. These eddy currents exist essentially at the surface of the pole piece shoe and follow the shoe's edges which extend axially with respect to the rotor and the end face edges of the shoe. The depth of penetration of these eddy currents into the pole piece shoe increases with increasing rotor speeds, while their impedance decreases.

These eddy currents in the pole piece cause a sudden and strong temperature rise in the pole piece shoe during start-up, when effective removal of the generated heat cannot be effected to any substantial extent. This temperature rise induces mechanical stresses in the pole piece shoe which can result in cracking or distortion of the same, thus creating a problem.

DESCRIPTION OF THE PRIOR ART

To overcome the above problem, the prior art teaches the formation of slots in the overhanging portions of the pole piece shoe, these slots extending from the shoe's axial edges circumferentially inwardly, partway towards the central portion of the pole piece shoe but far enough to subdivide the shoe's overhanging portions into a plurality of sections, each capable of thermally expanding and contracting relative to the other, whereby to relieve the pole piece shoe from any harmful effects of thermally induced stresses.

However, the above has the disadvantage that the slots, in mechanically dividing the pole piece shoe into sections, necessarily result in the formation of a plurality of pole piece areas in which the eddy currents induced during the asynchronous start-up of a machine using such pole pieces cause the eddy current paths to form loops having portions along the edges of each slot traveling in opposite directions and which, therefore, tend to cancel each other. It follows that the eddy current paths extending along the edges of the slots contribute practically nothing to the production of torque while at the same time increasing the impedance of the eddy current field in the pole piece shoe.

This increase in impedance caused by the mutually canceling components of the eddy currents is larger than that which occurs in the currents in the other parts of the pole piece shoe where such cancellation does not occur. The impedance of the eddy current paths along the edges of the slots is not frequency-dependant to the same degree as is the impedance of the current paths on the other portions of the pole shoe's surface because the vertical flanks of the slots participate in the conduction of the currents. The ineffective or mutually canceling current paths along the slots are therefore not tied to the radial depth of penetration of the solid shoe's surface to the same extent as the other or active current paths which must be relied upon to produce torque. It follows that the impedances along the current paths which run parallel to the edges of the slots do not decrease with increasing frequency or increasing rotor speed as fast as do the impedances of these active parts of the current paths. Therefore, the inactive or mutually canceling parts of the current paths become increasingly important as the speed of rotor rotation increases. Due to this, an appreciable drop in the rotor torque can occur, particularly when the rotor speed approaches synchronism when effective pull-in torque is required. With inadquate pull-in torque, complete machine synchronization is, of course, doubtful.

SUMMARY OF THE INVENTION

With the foregoing in mind, one of the objects of the present invention is to provide an electric salient-pole synchronous machine solid pole piece having a slotted shoe of the type described but which provides substantially the same starting torque as does a solid pole piece having an unslotted shoe.

According to the invention, this object is achieved by providing means for electrically bridging the pole piece shoe slots adjacent to the axial shoe edges from which these slots extend inwardly. In this way the eddy current paths can extend over the entire axial length of the pole piece shoe whereby the starting and pull-in torque characteristics become substantially the same as those of a solid pole piece having an unslotted shoe.

In effecting such electrical bridging, the various pole piece shoe sections separated by the slots must be permitted to thermally expand and contract. This need is satisfied by the use of bridging means which are mechanically flexible enough to permit relative motion among the various sections of the solid pole piece shoe.

The principles of the invention may be applied to a pole piece shoe having slots in the prior art manner, or through the use of a special arrangement of slots.

DETAILED DESCRIPTION OF THE DRAWINGS

Figure 1:
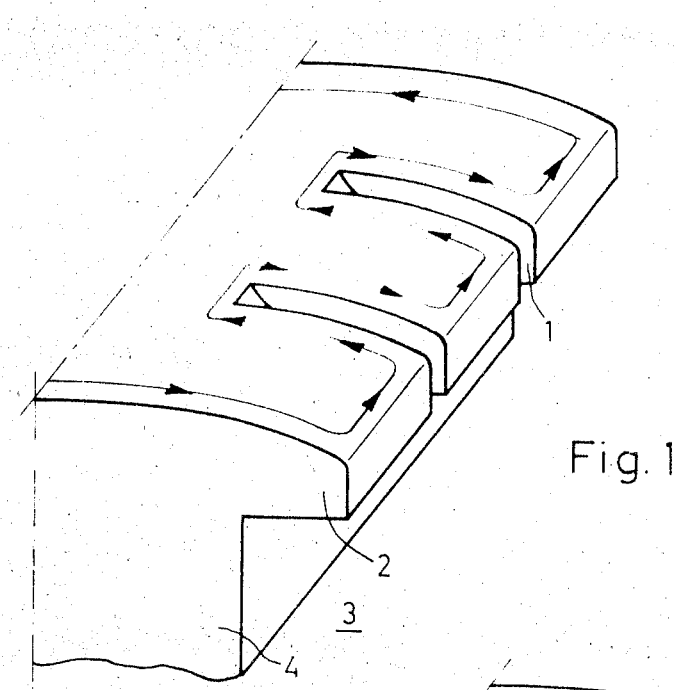
FIG. 1 is a perspective view showing one half of an example of a prior art slotted shoe pole piece.

In the drawings FIG. 1 shows a prior art slotted solid salient-pole for the rotor of an electric synchronous salient-pole machine. The circumferential slots 1 in the pole piece shoe 2 of the solid salient-pole 3 extend circumferentially with respect to the rotor's rotation, or parallel to the end faces 4 of the pole piece 3. These slots extend from the shoe's axial edges only part-way towards the central portion of the pole piece shoe but far enough to subdivide at least the overhanging portions of the shoe 2 into a plurality of sections, each capable of thermally expanding and contracting relative to the other, whereby to relieve the pole piece from the possible harmful effects of the thermally induced stresses.

In achieving the above advantage, however, the slots 1, in dividing mechanically the pole piece shoe into sections, necessarily result in the formation of a plurality of pole piece areas in which the eddy currents induced during the asynchronous start-up of the machine using such pole pieces, are distributed on the surface of the pole piece shoe approximately as indicated by the line with arrows in FIG. 1. As shown, the eddy current paths loop around each slot 1 with the mutually adjacent sides of each loop traveling in opposite directions. Consequently, the looped current paths, extending along the edges of the slots 1, contribute practically nothing to the production of torque because their currents run in opposite directions and almost cancel. At the same time, the impedance of the eddy current field is increased by the slots 1.

This increase in impedance caused by the mutually canceling components of the eddy currents is larger than that which occurs in the currents in the parts of the pole piece shoe where such cancellation does not occur. The impedance of the eddy current paths along the edges of the slots 1 is not frequency-dependent to the same degree as is the impedance of the current paths on the other portions of the pole shoe's surface, because the vertical flanks of the slots 1 participate in the conduction of the currents. The ineffective or mutually canceling current paths along the slots 1 are therefore not tied to the radial depth of penetration of the solid shoe's surface to the same extent as the other or active current paths which are effective to produce torque. It follows that the impedances along the current paths which run parallel to the edges of the slots 1 do not decrease with decreasing slip frequency, or increasing rotor speed, as fast as to the impedances of these active parts of the current paths. Therefore, the inner or inactive or mutually canceling parts of the current paths become increasingly important as the speed of rotor rotation increases. Due to this, an appreciable drop in the rotor torque can occur, particularly near synchronism when effective pull-in torque is required. With inadequate pull-in torque, complete machine synchronization is, or course, doubtful.

According to the present invention, means are provided for electrically bridging the slots 1 adjacent to the axial or lateral edges from which these slots extend inwardly. In this way the eddy current paths can extend over the entire axial length of the pole piece shoe whereby the starting and pull-in torque characteristics become substantially the same as those of a solid unslotted pole piece, particularly in the lower frequency ranges such as occur during the start-up of a synchronous salient-pole machine.

In effecting such electrical bridging, attention must be paid to the need for the various pole piece sections separated by the slots to thermally expand and contract. This need is satisfied by the use of bridging means which are mechanically flexible enough to permit relative motion between the various sections of the slotted pole piece shoe.

Figure 2:
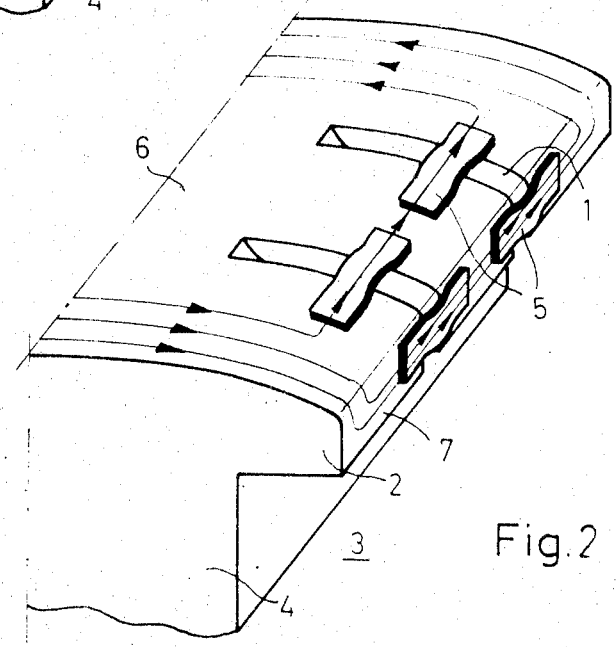
FIG. 2 is the same as FIG. 1 but shows an example of an application of the present invention.

Referring now to FIG. 2, the slotted pole piece of FIG. 1 is illustrated with mechanically flexible electric bridging elements 5 shown as bridging both the outer face of the shoe and also the circumferential end edges of the shoe, all of the straps being located adjacent to these end edges. Each of the elements 5 may comprise a flexible srap made of laminated thin spring laminations and being slightly sloped to transversely deflect and permit movement between the slotted shoe sections, the ends of the straps having the various laminations interconnected and connected to the pole piece shoes by screws' welding or the like. Mechanically, enough strength and fastening security must be provided to withstand the circumferential stresses to be expected due to the rotor speeds contemplated. The straps may be made of electrically highly conductive copper or bronze and should be capable of flexing repeatedly as required by the thermal expansion and contraction of the various sections of the shoe 2.

As can be seen from FIG. 2, the eddy current paths now follow continuously in a substantially straight direction axially over the entire axial length of the pole piece, thus preventing the previously described torque reduction to a large degree.

Figure 3:
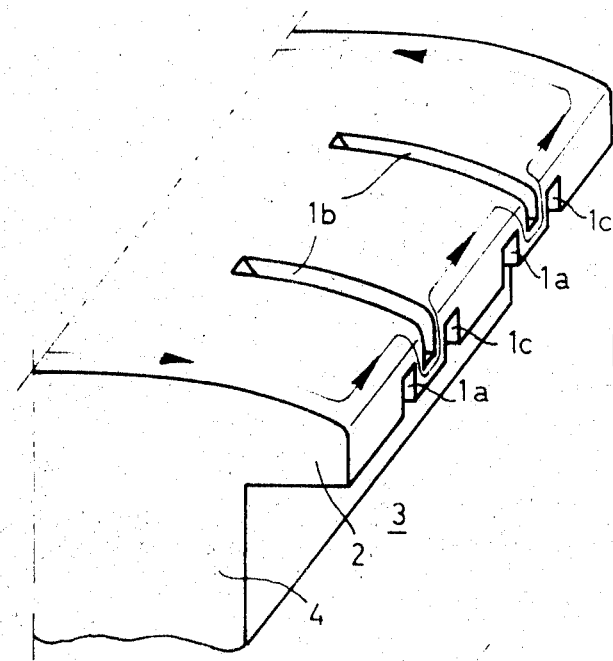
FIG. 3 is again the same but shows the pole piece slots of FIG. 1 modified to apply the principles of the present invention.

FIG. 3 shows the FIG. 1 construction with modified slots formed in it to provide overlapping subdivided slots separated axially by portions of solid shoe metal providing the described electrical bridging and reduced in thickness to provide mechanical flexibility axially.

More particularly, three adjacent bottomed subslots $1a$, $1b$ and $1c$ are respectively formed in the bottom, top and bottom sides of the overhanging portion of the shoe 2 and mutually overlap, the slots $1b$ corresponding to the slots 1 in FIG. 1 but not being circumferentially formed completely through the pole piece shoe axial end edge in this instance. The eddy current paths are illustrated by the lines with arrows, any mutually canceling portions being of short lengths.

Figure 4:
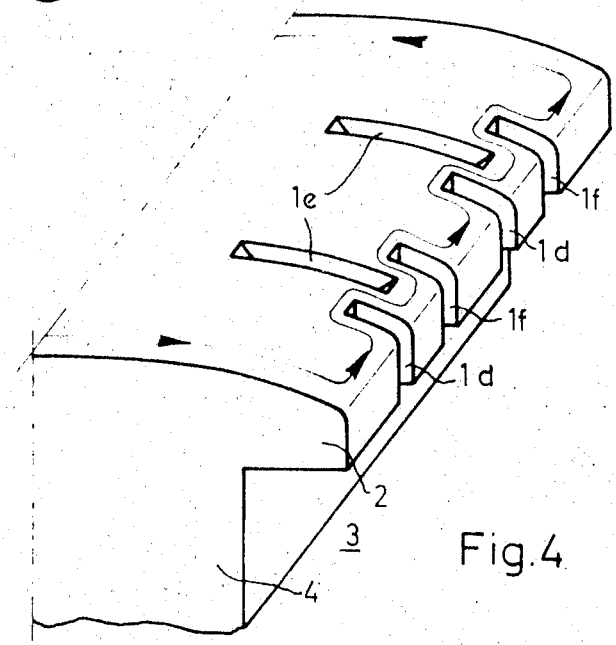
FIG. 4 is again the same kind of view as FIG. 1 but shows another modification of the slots.

Another modification is illustrated by FIG. 4 wherein the slots formed in the pole piece shoe 2 are in the form of subslots $1d$, $1e$ and $1f$ respectively, with different lengths extending parallel to the end face 4 or circumferentially with respect to the rotor direction. These subslots overlap in such a manner that between the subslots $1e$ and the circumferential edge of the shoe a metallic bridge remains in the general regions of that edge of the pole piece. The eddy current path again is illustrated by lines with arrows and can be seen to be of short lengths as to any mutual canceling portions.

It can be seen that in all of these examples the bridging of the slots 1, $1b$ and $1e$ in the various examples, by electrically conductive means adjacent to the axially extending edges of the pole piece shoe, the overall eddy current paths approximates or duplicates those existing in a solid metal pole piece which is unslotted. The current paths are approximately straight across the axially extending end edges with the end face edges completing the eddy current loop paths. The result is that both start-up and pull-in torques are both maintained substantially to the same degree as if the slots were absent. At the same time the flexibly bridged slots remain effective to reduce the stresses of thermally induced mechanical expansion and contraction of the pole piece shoe.

What is claimed is:

1. An electric salient-pole synchronous machine rotor solid pole piece having a shoe through which slots are formed which extend from the axial edges of the shoe inwardly parallel to the end faces of the shoe, wherein the improvement comprises means for electrically bridging said slots adjacent to said edges.

2. The pole piece of claim 1 in which said means are mechanically flexible.

3. The pole piece of claim 1 in which said means comprises flexible straps having high electrical conductivity and electrically connected to said shoe on opposite sides of said slots.

4. The pole piece of claim 3 in which said straps are looped sufficiently to permit relative movement between the shoe portions on opposite sides of said slots by transverse deflections of the straps.

5. The pole piece of claim 1 in which said slots are formed as overlapping subdivided slots separated axially by portions of solid shoe metal providing said electrical bridging and reduced in thickness to provide mechanical flexibility axially.

* * * * *